June 13, 1933.   J. SQUIRES   1,914,346
PROPELLER
Filed Aug. 24, 1931   3 Sheets-Sheet 1
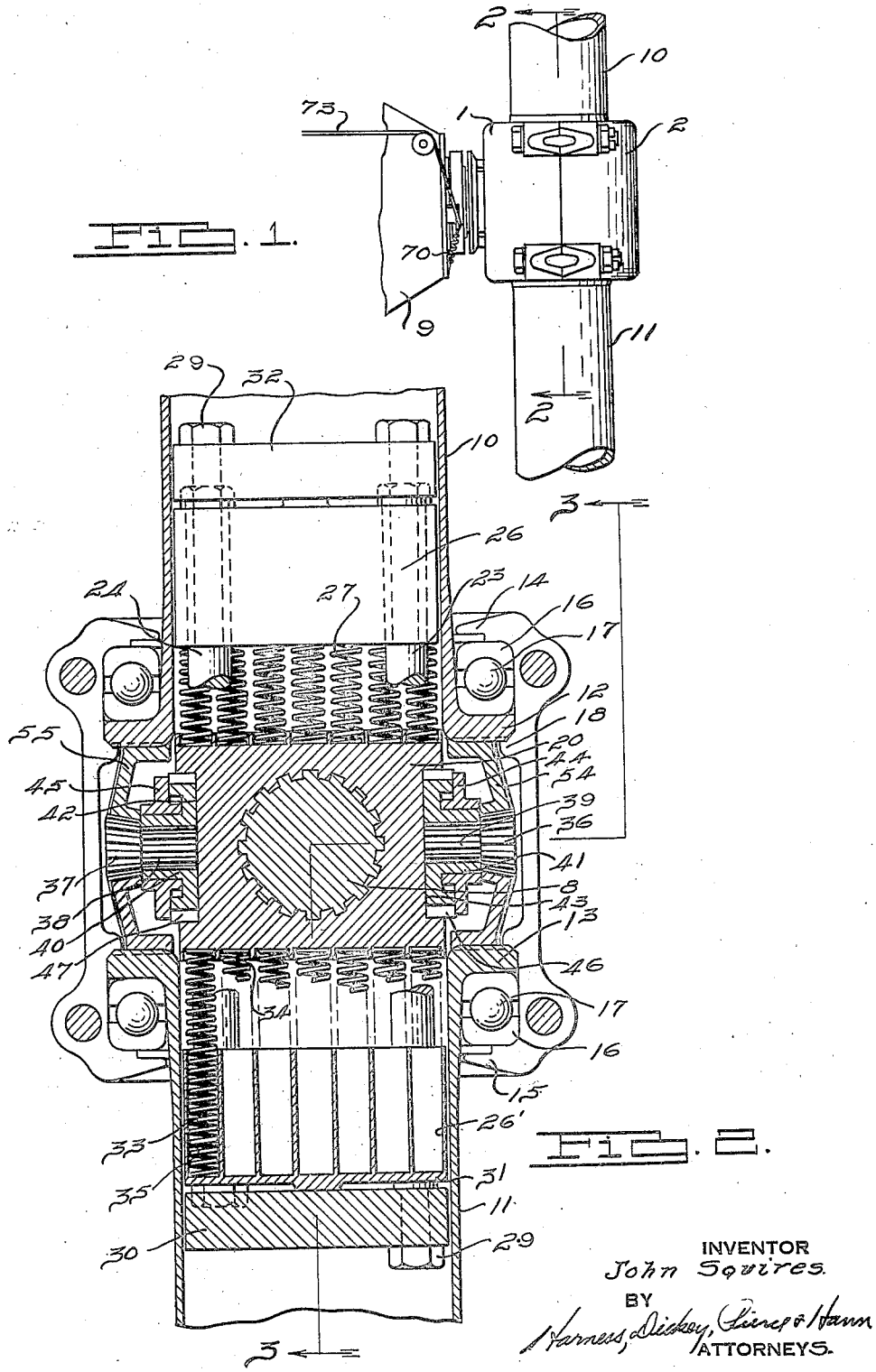
INVENTOR
John Squires.
BY
Harness, Dickey, Pierce & Hann
ATTORNEYS.

June 13, 1933. J. SQUIRES 1,914,346
PROPELLER
Filed Aug. 24, 1931 3 Sheets-Sheet 2
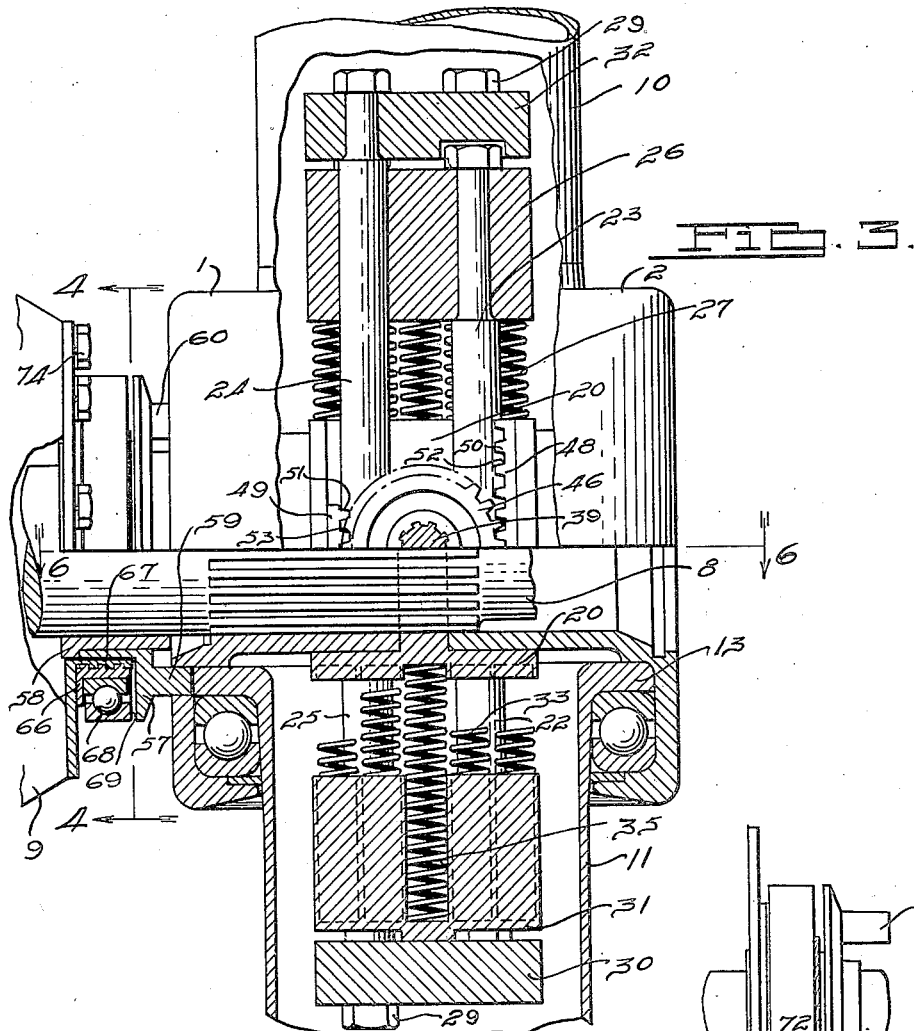
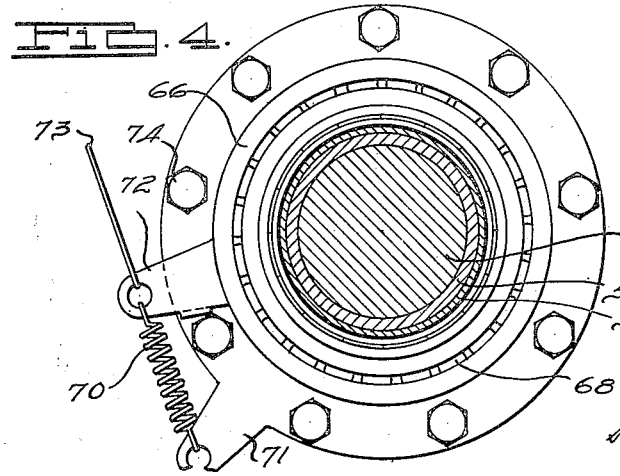
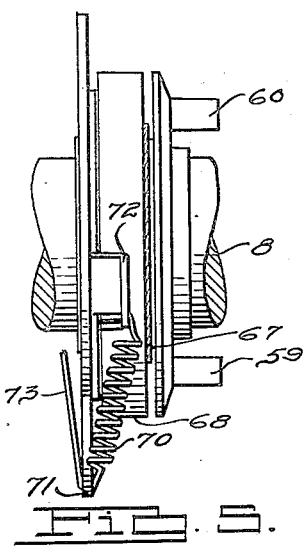
INVENTOR
John Squires.
BY
ATTORNEYS.

June 13, 1933.  J. SQUIRES  1,914,346
PROPELLER
Filed Aug. 24, 1931  3 Sheets-Sheet 3
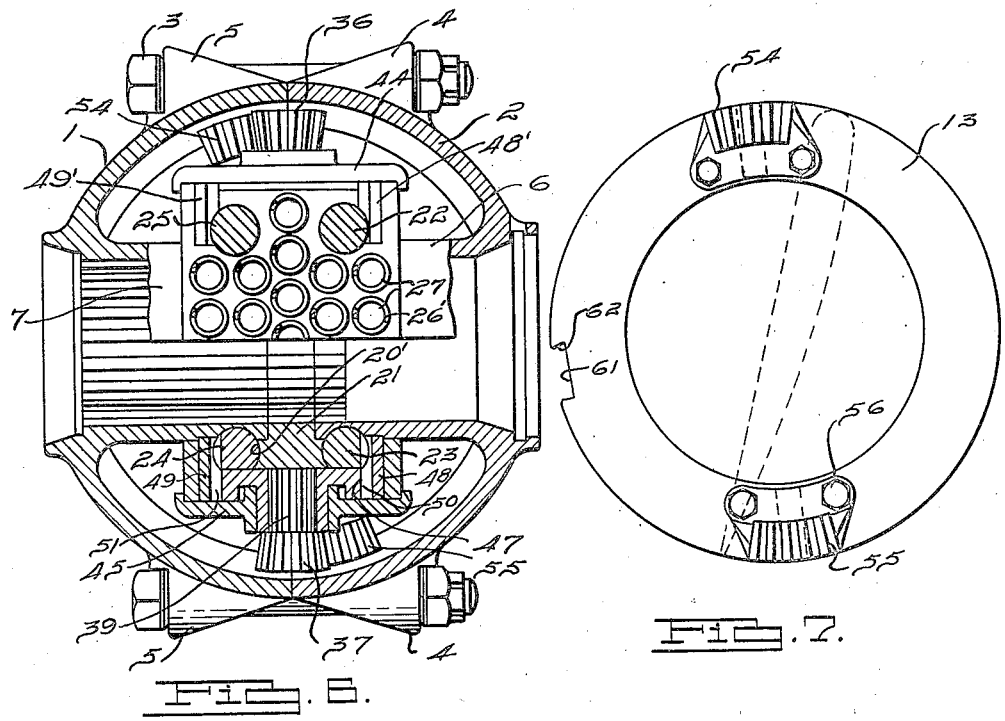
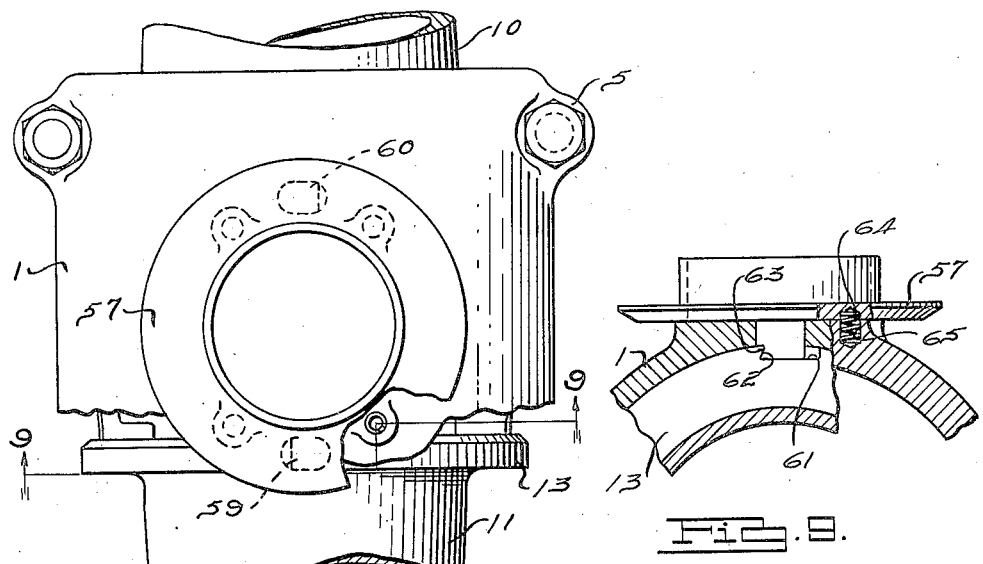
INVENTOR
John Squires.
BY
Harness, Dickey, Pierce+Hann
ATTORNEYS.

Patented June 13, 1933

1,914,346

UNITED STATES PATENT OFFICE

JOHN SQUIRES, OF HAGERSTOWN, MARYLAND

PROPELLER

Application filed August 24, 1931. Serial No. 558,970.

This invention relates to an improved variable pitch propeller of the type which is self adjustable during operation.

The main objects of the invention are to provide a propeller of this character which is automatically conditioned during rotation to maintain substantially full power of the engine by which it is driven during rotation of the propeller at a comparatively uniform speed; to provide mechanism for controlling the pitch of the blades which is completely enclosed within the hub structure and blades of the propeller and thereby protected from the elements; to provide means for yieldably holding the blades of the propeller in low pitch positions while an aircraft is gaining in forward movement or ascending; to provide means of this kind which is adapted to oppose increasing of the pitch of the blades until the engine closely approaches its normal rated speed; to provide mechanism which is responsive to the speed of rotation of the propeller and which is calibrated to increase the pitch of the blades from their minimum pitch positions to their maximum pitch positions within a very small difference of speed of rotation of the propeller at a predetermined speed of the engine; to provide blade governing mechanism of this kind which rapidly builds up the load on the propeller and engine by increasing the pitch of the blades so as to compensate for the load decreasing influence of forward movement of the aircraft when the propeller tends to exceed a predetermined speed of rotation; and to provide mechanism of this kind which also rapidly compensates, by decreasing the pitch of the blades, for the increase in the torque load on the propeller and engine which occurs in accelerating the forward movement of the aircraft.

Further objects of the invention are to provide automatic blade controlling mechanism which has its mass substantially symmetrically distributed with respect to the axis of rotation of the propeller and which therefore does not disturb the static or dynamic balance of the propeller; to provide centrifugally operable actuating members in the blade controlling apparatus which moves radially with respect to the axis of the propeller; to provide members of this character which extend into the inner open ends of the blade and move axially thereof; to provide improved mechanism for operatively connecting the centrifugal members with the blade; and to provide mechanism of this kind which simultaneously applies substantially equal and opposite torsional forces on opposite sides of the axes of the blades so as to prevent thrusting of the latter against the sides of the hub structure during turning of the blades about their axes from one pitch to another.

Other objects of the invention are to provide improved locking apparatus by which the propeller blades may be held in their cruising pitch position at the will of the operator; to provide apparatus of this character having a sufficient mechanical advantage to permit operation thereof by a control member extending into the cockpit of the aircraft; to provide means for preventing unintended releasing of the locking apparatus while the aircraft is operated at or below its cruising speed; and to provide locking apparatus of this character which automatically releases the blades and permits them to respond to the centrifugal controlling mechanism when the cruising speed is exceeded by a predetermined amount.

An illustrative embodiment of the invention is shown in the accompanying drawings, in which:

Fig. 1 is a fragmentary side elevation of the nose structure of an engine of an aircraft on which is mounted a propeller that embodies my invention.

Fig. 2 is a fragmentary vertical section taken on the line 2—2 of Fig 1.

Fig. 3 is a vertical section taken on the line 3—3 of Fig. 2, showing portions of the hub of the propeller and nose structure of the engine in side elevation.

Fig. 4 is a transverse vertical section taken on the line 4—4 of Fig. 3.

Fig. 5 is a left side elevation of the structure shown in Fig. 4.

Fig. 6 is a transverse horizontal section taken on line 6—6 of Fig. 3 showing the propeller removed from the propeller shaft.

Fig. 7 is an inner end elevation of a propeller blade which is equipped for operation by my improved blade controlling apparatus.

Fig. 8 is a fragmentary rear elevation of my improved propeller.

Fig. 9 is a fragmentary horizontal section taken on the line 9—9 of Fig. 8, showing the locking apparatus in its operative position.

In the form shown, my improved propeller has a hub portion which includes a pair of complementary sections 1 and 2 that are firmly clamped together with their edges abutting relationship by bolts 3 which extend through apertured bosses 4 and 5 on the hub sections 1 and 2, respectively. Integrally formed on the hub sections 1 and 2 are hub bosses 6 and 7 which extend inwardly and have spaced inner extremities. The hub bosses 6 and 7 are concentrically aligned for receiving a propeller shaft 8 that extends outwardly from a nose structure 9 of the engine of an aircraft.

The respectively opposite ends of the propeller hub are open for receiving rotatably adjustable propeller blades 10 and 11 which have radially extending flanges 12 and 13 at their root end portions. Integrally formed around the open ends of the hub are inwardly extending flanges 14 and 15 which overlap the flanges 12 and 13, respectively, of the propeller blade. Located between the corresponding flanges of the hub and blade are ball races 16 having ball bearings 17 therein. The ball races 16 hold the propeller blades against outward movement and permit substantially free rotation of the blades with respect to the hub even when the blades are forcefully urged outwardly by centrifugal action during rotation of the propeller. Inward movement of the propeller blades 10 and 11 with respect to the hub is prevented by inwardly extending flanges 18 and 19, respectively, formed on the inner periphery of the hub. When the propeller is at rest the flanges 12 and 13 of the blades 10 and 11, seat upon the inner flanges 18 and 19, respectively but during operation of the propeller the centrifugal action upon the blades holds the radial flanges of the blades off of the inner flanges 18 of the hub so as to eliminate frictional resistance to turning of the blades relative to the hub.

The rotatable blades 10 and 11 are normally urged toward their minimum pitch position by mechanism which is carried by a block 20 splined on the outer periphery of the hub bosses 6 and 7 and which has an intermediate portion 21 seated between the inner extremity of these hub bosses so as to prevent movement of the block axially thereof. The intermediate portion 21 may, if desired, be splined directly on the propeller shaft 8 as shown. Formed in the four corner portions of the block 20 are apertures 20′ having axes parallel to the axis of rotation of the propeller blades, in which are shiftably mounted rods 22, 23, 24 and 25. The diagonally opposite rods 23 and 24 have reduced end portions on which is mounted a counterpoise 26 that is provided in its radially inner face with a plurality of sockets 26′ in which coils springs 27 are received. The inner extremities of the coil springs 27 are received in recesses 28 formed in the adjacent face of the block 20. The shiftable rods extend into the interior passages of the propeller blades 10 and 11 and the counterpoise 26 and springs 27 are located in the interior of the blade 10. Rigidly secured by bolts 29 on the opposite ends of the bars 23 and 25 is a weight 30 which is located in the interior passage of the blade 11.

The diagonally opposite shiftable bars 22 and 24 which also extend into the interior passages of the propeller blades 10 and 11 have reduced end sections on which are secured a counterpoise 31 which is located in the interior passage of the propeller blade 11. The other end portions of the diagonally opposite rods 22 and 24 are slidably received in passages formed in the counterpoise 26 of the other diagonally opposite pair of rods. The rods 22 and 24 extend beyond the counterpoise 26 in which they are slidably received and are provided with a weight 32 which is secured thereto by bolts 33, the weight 32 being located in the interior passage of the blade 10. Springs 33 seated at their inner ends in recesses 34 in the block 20 and at their outer ends in sockets 35 formed in the counterpoise 31 normally urge the weight 32 inwardly in the same manner as the springs 27 which bear between the counterpoise 26 and the opposite side of the block 20 urge the weight 30 inwardly. During operation of the propeller the weights 30 and 32 are normally urged outwardly against the action of the springs 27 and 33 by the centrifugal action to which they are subjected due to the rotation of the propeller.

The movement of the shiftable rods or bars 22, 23, 24 and 25 which results from outward movement of the weights 30 and 32, which weights are so proportioned with respect to the counterpoises 26 and 31, and springs 27 and 33 as to respond to a predetermined speed of rotation of the propeller, is relied upon to turn the blades 10 and 11 about their respective axes. The movement of the rods is simultaneously transmitted to the propeller blades 10 and 11 by mechanism which includes a pair of pinions 36 and 37 each having a shank portion 38 and 39 on which are splined gears 40 and 41 respectively. The gears 40 and 41 are received in recesses 42 and 43 formed in opposite sides of the block 20, and they are rotatably secured to the block by caps 44 and 45 which are fixed to the opposite ends of the block by bolts, screws or other suitable means (not shown). Formed on the outer peripheries of the gears 40 and 41 are teeth 46 and 47, respectively. The teeth of each gear are meshed with pairs of racks 48 and 49 positioned on opposite sides thereof and guided for slidable movement longitudinally of the propeller blades by the block 20.

The racks 48 and 49 have elongated teeth 50 and 51 which mesh with teeth 52 and 53 formed in the adjacent shiftable bars 23 and 24 that move outwardly in respectively opposite directions under the centrifugal action upon the weights 30 and 32, respectively. The gear 41 which is associated with the bevel pinion 36 also meshes with elongated teeth of a pair of racks 48' and 49' which are located on opposite sides thereof and guided for movement in the block 10 longitudinally of the blades in the same manner as the racks 48 and 49. The elongated teeth of the latter rack mesh with teeth formed in the outer side of the adjacent shiftable bars 22 and 25 respectively. With this construction outward movement of the weights 30 and 32 and the diagonally opposite pairs of bars on which the weights are mounted, causes the gears 40 and 41, together with the bevel pinions 36 and 37 respectively, to be simultaneously and equally rotated with substantially equal force since one shiftable bar of each weight operates upon each of the gears.

The teeth of the bevel pinions 36 and 37 mesh with teeth of gear segments 54 and 55 which are secured by bolts 56 on the inner sides of the flanges 12 and 13 of the propeller blades. Since each bevel pinion meshes with bevel gear segments on each propeller blade, it is apparent that substantially balanced equal and oppositely directed forces are applied on the blades during their rotation by the blade controling apparatus.

In practice, the springs 27 and 33 are preferably calibrated to hold the weights 30 and 32 in their innermost position so as to retain the propeller blades at a desired minimum pitch, for illustration, 13 degrees, until the propeller has obtained a predetermined rate of revolution, for instance 2200 revolutions per minute. At 2200 revolutions per minute the weights begin to move outwardly and the counterpoises inwardly, causing rotation of the bevel pinions 36 and 37 which in turn simultaneously rotate the blades 10 and 11 toward increased pitch positions. The counterpoises 26 and 31 continue to move inwardly during increasing speed of rotation of the propeller until they abut against the block 20. With the construction shown, inward movement of the counterpoise is arrested at a desired maximum engine speed, for instance, 225 revolutions per minute, producing a maximum pitch which may be, for the purpose of illustration, 23 degrees.

During cruising flight of an aircraft it is sometimes highly desirable to retain the blades at a given pitch position irrespective of the operating speed of the propeller. My improved propeller is provided with locking mechanism by which this may be conveniently accomplished at the will of the operator. In the form shown, the locking apparatus includes a collar 57 which is splined on a sleeve 58 axially slidably mounted on the rear end of the hub. The collar 57 has integral lugs 59 and 60 which extend through apertures in the hub and are adapted to seat in notches 61 which are formed in the periphery of the flanges 12 and 13 of the propeller blades. The notches 61 are somewhat wider than the ends of the lugs 59 and 60 and they are provided with an undercut wall 62 on their leading side which abuts against an undercut edge 63 on the lugs 59 so as to hold the lugs against withdrawal from the notches until the propelled blades are turned in a counter-clockwise direction by augmenting the speed of rotation of the propeller momentarily. The collar 57 is constantly urged away from the hub by springs 64 which are seated in recesses 65 formed in the hub and which bear outwardly upon the collar 57, as illustrated in Fig. 9.

Actuating apparatus is provided for moving the collar outwardly with respect to the nose structure of the engine including a carrier 66 which in threaded on the nose structure of the engine by threads 67 having a substantially large pitch. Mounted on the carrier 66 is a ball race 68 having an outwardly protruding edge portion 69 which bears against the collar 57 when the carrier is screwed outwardly so as to urge the collar away from the nose structure 9 of the engine. The carrier 66 is normally held in retracted position by a coil spring 70 which is attached at one end to a fixed arm 71, and at its other end to an arm 72 which is integrally formed with the carrier. A wire or cord 73 is secured to the arm 72 of the carrier and extended rearwardly into the cockpit of the aircraft (not shown). When it is desired to lock the blades in their cruising pitch position, as a matter of illustration, 20 degrees, the wire 73 is pulled upon so as to urge the carrier 66 to turn in a counter-clockwise direction, as viewed in Fig. 4. The engine is then varied in its speed until the blade adjusting mechanism heretofore described turns the propeller blades sufficiently to bring the notches 61 into alignment with the lugs 59 and 60, at which time the pull on the cord 73, tending to turn the carrier 66, causes the carrier 66 to turn and move the collar 57 forwardly, thus projecting the lugs 59 and 60 into the notches 61.

When this occurs, if the engine speed is now reduced, the blade adjusting mechanism will operate to reduce the pitch of the blades and cause engagement of the undercut walls 62 on the blade flanges and undercut edges 63 of the lugs, thus preventing further decrease in the pitch of the blades and holding the lugs 59 and 60 from pulling out of the notches 61 under the force of the springs 64 without any further effort on the part of the operator. The pull on the wire may now be released on the part of the operator and the spring 70 will return the carrier 66 to its retracted position. The engine may now be operated at cruising speed with the propeller maintained and a constant predetermined high pitch favorable for cruising.

When it is again desired to render the automatic blade adjusting apparatus effective, all that is required on the part of the operator is to speed up the engine sufficiently to cause the blade adjusting mechanism to turn the blades sufficiently to disengage the undercut portions of the lugs 59 and 60 from the undercut walls of the notches 61 and the springs 64 will then return the collar 57 and lugs 59 and 60 to inoperative position.

In operation, the springs 27 and 33 balance the centrifugal action upon the weights 30 and 32 and the forces normally acting upon the blades which tend to turn them towards increased pitch position when the propelling driving engine is operated at full speed while the aircraft is at rest. When the load on the propeller is decreased sufficiently by forward movement of the aircraft to allow the propeller to exceed the normal full power operating speed of the engine, the weights 30 and 32 turn the blades from their minimum pitch position towards their maximum pitch position against the forces of the spring which act through the shiftable rods 22, 23, 24 and 25, and the gearing mechanism. In this manner the operation of the engine is maintained at its full load developing speed during varying speeds of forward movement of the aircraft. The governing apparatus is preferably designed to maintain the blades in their maximum pitch positions by rotation of the propeller at a relatively small increase, for example, 10 revolutions per minute, beyond the rated speed of the engine. Such a slight increase in the speed of the operation of the engine would not materially affect the power output thereof but it is sufficient to cause the blade governing mechanism to develop a substantially excess force.

All of the blade governing apparatus is entirely contained within the communicating passages of the propeller blades and interior of the hollow tub structure so as to effectively protect the mechanism from the elements. The turning forces are applied on the propeller blades at respectively opposite sides of their axes of rotation in substantially equal amplitudes and therefore all tendency of the propeller blades to be thrust against the side structure of the hub by unbalanced forces is eliminated. The locking mechanism has a sufficient mechanical advantage to permit of its operation by a cord or wire and it operates directly upon the blades so as to positively hold them from displacement from a selected position.

Formal changes may be made in the specific embodiment of the invention described without departing from the spirit or substance of the broad invention, the scope of which is commensurate with the appended claims.

I claim:

1. A propeller including a hollow hub, an adjustable blade journaled in said hub, a support in said hub, a pair of shiftable elements mounted on said support extending on respectively opposite sides of the axis of rotation of said propeller, a pair of weights located on opposite sides of said axis, one mounted on each of said shiftable elements, counter weights on the opposite ends of said shiftable elements, yieldable means bearing between said counter weights and the opposite sides of said support respectively for opposing outward movement of said weights, and a pair of driving members each operable by one of said shiftable elements and each coacting with said blade on respectively opposite sides of its axis for turning said blade relative to said hub.

2. In an aircraft including a substantially hollow propeller having rotatably adjustable blades and an engine for driving said propeller, means on said propeller having a stationary nose structure adjacent the latter for turning said blades in response to the speed of rotation of said propeller, and locking mechanism including a member shiftably mounted on the nose structure of said engine and having lugs engageable with the blades of said propeller for selectively holding the latter positively against rotation from predetermined pitch positions.

3. In an aircraft including a substantially hollow propeller having rotatable adjustable blades and an engine for driving said propeller, means responsive to the speed of rotation of said propeller for varying the pitch of said blades, locking mechanism including a member shiftably mounted on the nose structure of said engine and having lugs engageable with the blades of said propeller for selectively holding the latter positively against rotation from predetermined pitch positions, and actuating apparatus for said shiftable members including an element threaded on said nose structure and having a flexible operating member extending to the cockpit of said aircraft.

4. A propeller comprising, in combination, a hub, a plurality of blades carried thereby for pitch adjusting movement, centrifugally operable means associated with said propeller for controlling said pitch adjusting movement of said blades, a member shiftably mounted on said hub having elements engageable with said blades for positively holding the latter against turning in either direction relative to said hub; and manually operable means engageable with said member for urging the latter to an inoperative position.

5. A propeller including a hub structure, a pair of rotatably adjustable blades journaled at diametrically opposite locations on said hub structure, a blade turning element carried by said hub structure cooperating with both of said blades for simultaneously turning the latter in opposite directions through substantially equal arcs respectively, a pair of shiftable rods carried by said hub structure and extending beyond opposite sides of the latter and substantially parallel to the axis of said blades, a pair of weights one fixed on one end of a shiftable rod and the other fixed on the opposite end of the other shiftable rod adapted to move said rods outwardly under centrifugal action during rotation of said propeller, a pair of abutment elements, one fixed on the end of each rod opposite the weight thereof, means connecting said rods and blade turning element for actuating the latter in response to movement of said weights, and springs bearing between opposite sides of said hub structure and each of said abutment elements respectively for opposing outward movement of said weights and rods.

6. A propeller including a hub structure, a pair of rotatably adjustable blades journaled at diametrically opposite locations on said hub structure, a blade turning element carried by said hub structure cooperating with both of said blades for simultaneously turning the latter in opposite directions respectively, a pair of rods shiftably mounted in apertures in said hub structure extending beyond the opposite sides of the latter substantially parallel to the axis of said blades, a pair of weights, one fixed on one end of one shiftable rod and the other fixed on the opposite end of the other shiftable rod, a pair of counterpoises each located between one side of said hub structure and one of said weights respectively and each engageable with one of said weights, one fixed on the end of each rod opposite the end thereof, means connecting said rods and blade turning element for actuating the latter in response to movement of said weights, and springs bearing between opposite sides of said hub structure and each of said counterpoises respectively for holding each counterpoise in contact with the adjacent weight with a predetermined force so as to oppose outward movement of said bars within a predetermined range of speed of said propeller.

7. A propeller including a hub structure, a pair of rotatably adjustable blades journaled on said hub structure, a pair of blade turning elements carried by said hub structure located symmetrically with respect to the axis of rotation of said propeller and each cooperating with both of said blades for simultaneously turning the latter in opposite directions respectively, pairs of rods shiftably mounted in apertures in said hub structure, the rods of each pair being equally spaced with respect to the axes of the propeller and blades respectively, a pair of weights, one fixed on the adjacent ends of one pair of rods and the other fixed on the opposite ends of the other pair of rods, a pair of counterpoises each located between one side of said hub structure and one of said weights respectively and each engageable with one of said weights, one of said counterpoises being fixed on the adjacent ends of each pair of rods opposite the weight thereof, means connecting the rods of each pair with one of said blade turning elements respectively for actuating the latter in response to movement of said weights, and springs bearing between opposite sides of said hub structure and each of said counterpoises respectively for holding each counterpoise in contact with the adjacent weight with a predetermined force so as to oppose outward movement of said bars within a predetermined range of speed of said propeller.

8. In a propeller, a hub including a pair of convenable sections having registering hub bosses for receiving a propeller shaft, a block mounted on said hub bosses having spaced apertures therein, a pair of rotatably adjustable blades journaled in diametrically opposite ends of said hub, each having a pair of oppositely located gear segments on their adjacent ends, a pair of gears each meshed with a gear segment of both blades, actuating mechanism connected with said segments including a pair of rods slidably mounted in said apertures having weights fixed on two of their non-adjacent ends and counterpoises on their other ends adapted to move outwardly under centrifugal action during operation of said propeller for increasing the pitch of said blades, and springs bearing between the opposite sides of said blocks and said counterpoises normally retaining said blades in their minimum pitch positions.

9. A propeller including a hub structure, a pair of rotatably adjustable blades journaled on said hub structure, blade turning apparatus carried by said hub structure having at least one element cooperating with both of said blades for simultaneously turning the latter with respect to said hub structure, a pair of shiftable members slidably mounted on said hub structure extending beyond the opposite sides thereof and connected with said blade turning apparatus, each having a counterpoise on their non-adjacent ends, springs bearing between opposite sides of said hub structure and each of said counterpoises respectively under an initial compression normally opposing increasing of the pitch of said blades from a minimum pitch under propeller operating speeds of substantially 2200 revolutions per minute, and weights on the other ends of said shiftable member proportioned with respect to said counterpoises and with respect to the resistance of said springs to further compression for increasing the pitch of said blades to a maximum pitch within a propeller speed range of from substantially 2200 to 2210 revolutions per minute.

10. In an aircraft, a rotatable propeller shaft, stationary structure on said aircraft in close proximity thereto, a propeller including a hub portion fixed on said shaft adjacent said stationary structure having rotatably adjustable blades journaled in said hub portion, means responsive to rotation of said propeller for increasing the pitch of said blades, means for yieldably urging said blades toward their minimum pitch positions, a member shiftable relative to said hub structure having elements directly engageable with said blades for positively holding the latter in predetermined positions, and mechanism carried by said nose structure including an extensible element, engageable with said member and including manually operable means for projecting said extensible element against said members and moving the blade contacting elements into engagement with said blades.

11. In an aircraft, a rotatable propeller shaft, stationary structure on said aircraft in close proximity thereto, a propeller including a hub portion fixed on said shaft adjacent said stationary structure having rotatably adjustable blades journaled in said hub portion, means responsive to rotation of said propeller for increasing the pitch of said blades, means for yieldably urging said blades toward their minimum pitch positions, a member shiftable relative to said hub structure having elements directly engageable with said blades for positively holding the latter in predetermined positions, and mechanism carried by said nose structure including an extensible element, engageable with said member having a collar journaled thereon for contacting with said shiftable member during operation of said propeller and including manually operable means for projecting said extensible element toward said hub structure and moving the blade contacting elements into engagement with said blades.

12. In combination, an aircraft having a propeller shaft and associated stationary structure, a propeller hub fixed on said shaft, rotatably adjustable blades journaled in said hub having notches therein, a member shiftable relative to said stationary structure having elements receivable in said notches for holding said blades in predetermined positions, resilient means normally urging said shiftable member toward an inoperative position, and means carried by said stationary structure having an extensible element engageable with said shiftable member for moving the latter to an operative position.

13. In combination, an aircraft having a propeller shaft and associated stationary structure, a propeller hub fixed on said shaft having slots therein, a pair of propeller blades journaled in said hub portion each having a notch registerable with one of said slots when said blades are in a predetermined position, an element shiftable relative to said hub portion having lugs normally disposed in the slots thereof, resilient means normally holding said lugs out of the notches of said blades, a member carried by said stationary structure movable outwardly therefrom and engageable with said shiftable member, and manually operable means for urging said member and shiftable element toward said blades so as to engage said lugs in the notches thereof.

14. A propeller including a hub portion having slots therein, a pair of rotatably adjustable blades each having a notch therein registerable with one of said slots when said blades are in predetermined pitch positions, a corresponding end of each notch being under cut, resilient means for yieldably urging said blades toward their minimum pitch positions, means responsive to rotation of said propeller for increasing the pitch of said blades against the action of said resilient means, an element shiftable relative to said hub portion, actuating mechanism for moving said element toward said hub portion, lugs on said element normally disposed in said slots, each having an undercut portion receivable in the undercut end of one of the notches of said blades when they are held in said predetermined positions by said resilient means for holding said lugs in said notches independently of said actuating mechanism, and a spring bearing between said hub and shiftable element adapted to urge the latter outwardly therefrom when the under cut portions of said lugs and notches are disengaged by rotation of said blades under the influence of said pitch increasing means.

15. In an aircraft having a stationary structure and having a propeller adjacent thereto comprising a hub and rotatably adjustable blades, apparatus for establishing the pitch of said propeller at a predetermined advanced value during rotation of said propeller including locking mechanism comprising an actuating member shiftably mounted on said stationary structure and a latching element engageable thereby shiftably mounted on said hub structure and having lugs receivable in notches of said blades for holding the latter against decreasing from predetermined pitch positions, and means responsive to rotation of said propeller for bringing said notches into registration with said lugs and said blades to said predetermined pitch positions.

16. In an aircraft having a stationary structure and having a propeller adjacent thereto comprising a hub and rotatably adjustable blades, apparatus for establishing the pitch of said propeller at a predetermined advanced value during rotation of said propeller including locking mechanism comprising an actuating member shiftably mounted on said stationary structure, and a latching element engageable thereby, shiftably mounted on said hub and adapted to interlock with portions of said blades for positively holding the latter against displacement from predetermined advanced pitch positions, and means responsive to rotation of said propeller for bringing said portions of said blades into operative relation with said latching element and to said predetermined pitch positions.

17. In an aircraft having a stationary structure and having a propeller adjacent thereto comprising a hub and rotatably adjustable blades, apparatus for establishing the pitch of said propeller including locking mechanism comprising an actuating member shiftably mounted on said stationary structure, a latching element engageable thereby, shiftably mounted on said hub and adapted to interlock with portions of said blades for holding the latter against displacement from predetermined advanced pitch positions, and means responsive to rotation of said propeller for bringing said portions of said blades into operative relation with said latching element and to said predetermined pitch positions for shifting said actuating member, and manual operating means attached to the latter and extending to within reach of operator of said air craft.

18. A propeller including a hub structure, a pair of rotatably adjustable blades journaled in said hub structure, a pair of rods shiftably mounted in said hub structure and extending on opposite sides thereof, a pair of weights one fixed on one end of a shiftable rod and the other fixed on the opposite end of the other rod adapted to move said rods outwardly under centrifugal action during rotation of said propeller, a pair of abutment elements, one fixed on the end of each rod opposite the weight thereof, means operable by said rods for turning said blades in response to movement of said weights, and springs bearing between opposite sides of said hub structure and each of said abutment elements respectively for opposing outward movement of said weights and rods.

19. A propeller including adjustable blades, means for proportioning the pitch of said blades with respect to the speed of rotation of said propeller, locking mechanism for holding said blades against decreasing below a predetermined pitch including means for preventing the application of said locking mechanism during all speeds lower than said predetermined speed, and manual control apparatus for selectively applying said locking mechanism during operation of said propeller substantially at said predetermined speed.

20. In an aircraft including an engine having a propeller shaft, a propeller having a hub fixed on said shaft and including rotatably adjustable blades, synchronizing mechanism operatively mounted on said hub, means operatively connecting the blades of said propeller with said synchronizing mechanism, means including springs urging said synchronizing mechanism in one direction for holding said blades in their minimum pitch positions, and centrifugal members coacting with said synchronizing mechanism for increasing the pitch of said blades against the action of said springs, said springs having an initial compression of sufficient magnitude to hold said blades against turning from their minimum pitch positions until the rated full power speed of said engine is approached.

21. In an aircraft including an engine having a propeller shaft, a propeller having a hub fixed on said shaft and including rotatably adjustable blades, mechanism mounted on said hub and connected with said blades for positively and synchronously turning the latter relative to said hub, springs urging said blade turning mechanism in one direction for holding said blades in their minimum pitch positions, and centrifugal member coacting with said blade turning mechanism for increasing the pitch of said blades against the action of said springs, said springs having an initial compression of sufficient magnitude to hold said blades against turning from their minimum pitch positions until the rated full power speed of said engine is approached.

JOHN SQUIRES.

CERTIFICATE OF CORRECTION.

Patent No. 1,914,346.  June 13, 1933.

JOHN SQUIRES.

It is hereby certified that error appears in the printed specification of the above numbered patent requiring correction as follows: Page 3, line 64, for "225" read "2225"; line 89, for "propelled" read "propeller"; and line 100, for "in" read "is"; page 4, line 61, for "tub" read "hub"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.